United States Patent [19]
Bick et al.

[11] 3,878,068
[45]* Apr. 15, 1975

[54] METHOD FOR ELECTROPLATING GOLD AND ELECTROPLATING BATHS THEREFOR

[75] Inventors: Maurice Bick, South Orange; Jean A. Lochet, Metuchen, both of N.J.

[73] Assignee: Auric Corporation, Newark, N.J.

[ * ] Notice: The portion of the term of this patent subsequent to Dec. 26, 1989, has been disclaimed.

[22] Filed: July 12, 1973

[21] Appl. No.: 378,703

Related U.S. Application Data

[63] Continuation-in-part of Ser. Nos. 273,860, July 21, 1972, Pat. No. 3,770,596, and Ser. No. 288,020, Sept. 11, 1972, Pat. No. 3,783,111.

[52] U.S. Cl. .......................... 204/46 G; 204/43 G
[51] Int. Cl. ....... C23b 5/28; C23b 5/42; C23b 5/46
[58] Field of Search .......................... 204/43 G, 46 G

[56] References Cited

UNITED STATES PATENTS

| | | | |
|---|---|---|---|
| 3,770,596 | 11/1973 | Bick et al. | 204/43 G |
| 3,783,111 | 1/1974 | Bick et al. | 204/46 G |

*Primary Examiner*—G. L. Kaplan
*Attorney, Agent, or Firm*—Stefan J. Klauber, Esq.

[57] ABSTRACT

A gold electroplating bath including in aqueous solution an alkali-gold cyanide; as a chelating agent trans-1, 2-diaminocyclohexane tetra acetic acid, ethylenediamine tetra methylenephosphonic acid, or the bath soluble salts thereof; together with quantities of hydrazine, small amounts of trivalent arsenic ion, and one or more alkali phosphate compounds.

13 Claims, No Drawings

METHOD FOR ELECTROPLATING GOLD AND ELECTROPLATING BATHS THEREFOR

This application is a continuation-in-part of our copending applications, Ser. No. 273,860, filed July 21, 1972, now U.S. Pat. No. 3,770,596, for "GOLD PLATING BATHS FOR BARREL PLATING OPERATIONS," and Ser. No. 288,020, filed Sept. 11, 1972, now U.S. Pat. No. 3,783,111, for "GOLD PLATING BATH FOR BARREL PLATING OPERATIONS," which applications are assigned to the same assignee as the instant application.

BACKGROUND OF INVENTION

This invention relates generally to electroplating baths, and more specifically relates to such baths as are useful in the electroplating of gold.

Gold, within recent years, has become a very important part of the electronics industry. Among those properties recommending its use therein, are its relative inalterability, high solderability, and low contact resistance. In the semi-conductor field, gold has furthermore found favor because of its ability to readily form a eutectic alloy with silicon and germanium.

In the latter connection, it may be noted that most headers or packages for diodes, transistors, and integrated circuits are gold-plated as a preparation for the mounting or attaching of the semi-conductor devices. For such an application, the gold deposit must be of high purity, and deposited as uniformly as possible, in order to readily alloy with silicon or other metallic contacts. The problem of plating such parts is compounded by the fact that these components are irregularly shaped and of complicated design. Such parts are exemplified by the well-known line of TO-5 and TO-8 multi-lead headers. Such headers consist of an eyelet of Kovar metal to which several insulated Kovar leads are attached, and sealed in glass.

In accordance with known principles in the art, headers of the foregoing type have in the past been plated (among other methods) by so-called barrel plating techniques — that is, by subjecting such articles to electroplating while a plurality of articles tumble in a barrel. When such articles are thus plated, however, it is found that many leads do not make electrical contact with the remainder of the load. Where such conditions obtain during the plating cycle, the portion of the lead closest to the anode becomes cathodic. Such leads become bipolar, and at the anodic portions of the leads problems can arise in that (a) the gold may re-dissolve anodically; and (b) the base metal can be attacked to expose bare spots — especially where the plating solution includes high concentrations of citrates or phosphates. Should the tumbling action be markedly inadequate, these problems can become quite severe. In the past, these difficulties have partially been overcome by incorporating mechanical means for improving the electrical conductivity through the load. Such means have taken the form of metal particles, or metal shot. Unfortunately, during the plating operation the shot itself becomes gold plated, resulting in loss of gold, and attendant increase in the cost of plating the desired objects — i.e., the headers, etc.

In our above-cited copending application, Ser. No. 273,860, we have disclosed our finding that an alkali-gold cyanide (AGC) electroplating bath including a chelating phosphonic acid, with additional quantities of hydrazine and small amounts of arsenic and/or lead ion, eliminates or minimizes many of the cited problems, and in fact provides superior performance in the aforementioned barrel plating operations. Furthermore, in our cited copending application, Ser. No. 288,020, we have disclosed our findings that an electroplating bath including in addition to an alkali-gold cyanide, one or more chelating aminocarboxylic acids, or soluble salts thereof, together with quantities of hydrazine and small amounts of arsenic and/or lead ion, is similarly effective in eliminating or minimizing many of the cited problems.

Here it may be noted that among those baths having wide application for the electroplating of gold, as above discussed, are the prior art phosphate-buffered baths of the type illustrated, for example, in Table I of U.S. Pat. No. 3,669,852 to E. D. Winters. A bath of this type is typically made up and utilized as follows:

EXAMPLE I

| | |
|---|---|
| Gold, as potassium gold cyanide | 8 g/l |
| Dipotassium phosphate | 40 g/l |
| Mono potassium phosphate | 10 g/l |
| pH adjusted to | 7.0 |
| Plating temperature | 65°C |

A bath of the Example I type is said to have an efficiency of the order of 83 percent. When 10 grams/liter of hydrazine sulfate are added to the above bath, as is discussed in Example II of the cited U.S. Pat. No. 3,669,852, a significant increase in efficiency is noted from about 83 percent to 92 percent. The explanation given in the patent is the presumed removal of oxygen by the reducing agent hydrazine sulfate. Other means of removal of oxygen are also disclosed in the said patent. It may be noted, further, that the foregoing bath is also reported in the cited patent to be relatively unstable, especially where relatively high hydrazine content is present. Baths of this type, in other respects suffer from many of the problems discussed in connection with the prior art, particularly the problem of plating headers or the like without the production of bare spots.

In accordance with the foregoing, it may be regarded as an object of the present invention to provide gold electroplating baths enabling improved metal distribution, and superior aesthetic properties in the resulting platings.

It is a further object of the present invention, to provide electroplating baths for use in barrel plating operations, which are highly effective in reducing effects of bipolarity.

It is a further object of the present invention, to provide gold electroplating baths for use in barrel plating electronic components or the like, which baths display reduced tendencies to attack the base metal of the said components.

It is another object of the invention, to provide gold electroplating baths, especially suited for use in barrel plating of electronic components or the like, which prevent or slow down codeposition with the gold of the troublesome common impurities, such as copper, nickel, cobalt, iron and lead.

It is a yet further object of the present invention, to provide an electroplating bath suitable for barrel, rack plating, etc. of substantially pure gold, which is phosphate-buffered, of high stability and long life, which yields excellent distribution and aesthetic properties in the resultant gold platings, and which provides plating efficiencies up to 100 percent.

SUMMARY OF THE INVENTION

Now in accordance with the present invention, it has been found that the foregoing, and other objects as will become apparent in the course of the ensuing specification, are achieved in an electroplating bath which includes in addition to an alkali-gold cyanide, a chelating agent selected from one or more members of the group consisting of trans-1, 2-diaminocyclohexane tetra acetic acid (CDTA), ethylenediamine tetra methylenephosphonic acid (EDMA), and the bath soluble salts thereof, together with quantities of hydrazine, small amounts of trivalent arsenic ion, and one or more alkali phosphate compounds, the latter being present in concentrations yielding a specific gravity of between 8° and 20° Baume. The pH of the bath may in general reside in the range of from about 3 to 8 with a preferable pH range being between 6.5 and 8.0. These baths, which include arsenic in the preferable forms of sodium or potassium arsenite, allow the reduction of the plating temperatures to as low as 50°C, and at least partially in consequence, increase the stability of the said baths — in that the higher the temperatures for a bath of the general type set forth in Example I — the more unstable the bath becomes. These present baths are primarily intended for the plating of substantially pure gold, and when the baths are used in conventional plating operations including particularly barrel plating operations, the resultant metal distribution is excellent, with the surface of the platings displaying a pleasant lusterous lemon-yellow color. The efficiency of the new baths is up to 100 percent, an aspect of baths of the present type which is discussed in our copending Ser. No. 273,860 application, and which is believed to result by virtue of a synergistic effect occurring between the chelating agent, hydrazine, and the trivalent arsenic ion.

Gold is present in the baths of the invention in a typical range of from about 2 to 36 g/l with a preferable range of addition being between 7 and 12 g/l. The chelating agent, i.e., CDTA or EDMA, is present in concentrations between about 0.5 and 60 g/l, with 1 to 5 g/l being preferable. The trivalent arsenic may be utilized at levels between about 0.4 and 12 mg/l with a range of from about 1 to 3 mg/l being preferable. The lower limit of such agent may also be described as being such as provides improved distribution and aesthetic qualities in the resultant plating as compared to a composition which is otherwise similar, but lacking the said ionic agent.

DESCRIPTION OF PREFERRED EMBODIMENT

In order to illustrate certain important aspects of the invention, there is set forth in Example II below, a bath which includes the components of the present invention except for the chelating agent:

Example II

| | |
|---|---|
| Gold as P.G.C. | 8 g (as metal) |
| Mono potassium phosphate | 40 g |
| Dipotassium phosphate | 100 g |
| Hydrazine 64% | 5 ml |
| Trivalent arsenic | 2 mg (as metal) |
| Deionized water to yield | 1000 ml |

-Continued

Example II

| | |
|---|---|
| pH adjusted to | 7.0 |
| Plating temperature | 50°C |

The bath set forth in Example II is capable of producing very acceptable deposits on TO-5 multi-lead headers, for example, where plating of such objects is conducted in the bath at a current density of about 2 amp/sq.ft. (ASF), and indeed provides plating action at efficiencies approaching 100 percent. The plated components are free of bare spots and the distribution of metal is good. The gold is of a pleasing lemon-yellow color, is semi-bright and readily solderable. The Kovar parts have to be precoated in a suitable acid strike bath at a pH of about 3.8 to secure proper adhesion. The strike bath, such as is disclosed in Example IV of our copending Ser. No. 354,697 application, filed Apr. 26, 1973, is suitable for such purposes.

In preparing the bath of Example II, one adds the conducting and buffering compounds, i.e., the alkali phosphates, in quantities which yield a bath specific gravity appropriate to the bath application — i.e., generally yielding a specific gravity of from about 8° to 20° Baume, and preferably between 12° to 16° Baume. Thereafter the pH of the bath, as required, may be adjusted by addition of small quantities of innocuous acids or bases (e.g. phosphoric acid and tripotassium phosphate) — as is known in the art.

While the bath of Example II is indeed advantageous in many applications, a number of problems yet tend to be evidenced thereby. Firstly, such bath has a tendency to be unstable and to break down during usage because of local overheating, etc. The bath, furthermore, is overly sensitive to high current densities, which may also break down the solution. It is further observed that the arsenic has a tendency to come out of solution when the bath is not in use, which decreases the usefulness of the solution, and also leads toward instability. Similarly, as has been discussed in connection with Example I, the higher the temperature utilized with the bath, the greater the resulting instability.

In accordance with the present invention, it is found that all of the above-cited problems occurring in the bath of Example II, are substantially removed when a small quantity of the cited trans-1 2-diominocyclohexane tetra acetic acid is added thereto. The said chelating agent, which is henceforth referred to as CDTA is available commercially from Geigy Chemicals under the designation "Chel CD." When this agent is added in appropriate quantities, the bath becomes exceedingly stable, the arsenic does not precipitate out, and the bath remains very clear under a wide variety of operating conditions. Generally similar results are achieved where the chelating agent comprises the EDMA compound previously cited, which compound is available from Monsanto under the designation "Dequest 2041." However, as will become apparent from the ensuing Examples III through VII, the unusual results achieved in accordance with the invention are not yielded where certain other common chelating agents are employed, although on theoretical considerations it might seem that similar results would be secured.

Examples III - VII

| | III | IV | V | VI | VII |
|---|---|---|---|---|---|
| Basic Formula of Example II | 1000 ml | 1000ml | 1000ml | 1000ml | 1000ml |
| CDTA | 5 g/l | — | — | — | — |
| EDMA | — | 3 g/l | — | — | — |
| EDTA | — | — | 1 g/l | — | 2 g/l |
| NTA(Nitrilotriacetic acid) | — | — | — | 5 g/l | — |
| pH | 7.0 | 7.0 | 7.0 | 7.0 | 4.0 |
| Temperature | 50°C | 50°C | 50°C | 50°C | 50°C |
| Current density | | from about 2 to 4 ASF | | | |

The pH in each instance in the above baths, is again adjusted by means of suitable innocuous acids or baths. Where the bath of Example VII above is used as a strike bath for Kovar at a pH of about 4.0, the gold content is preferably held between 0.3 to ½ troy ounce per gallon. The useful life of such a strike bath however is usually short, and the content of said bath is only given here to illustrate certain aspects of the invention. A strike bath such as that described in our copending application Ser. No. 354,697, filed Apr. 26, 1973 for GOLD ELECTROPLATING BATHS is actually preferable for those instances where strike formulations are required. The principal point of interest for present purposes, however, is that it is found in practice that the baths of Examples V, VI and VII, do not yield the stability characteristics evidenced by the baths of Examples III and IV.

Thus, for example, where the EDTA-containing bath of Example V is prepared, an acceptable bath is initially obtained. If, however, the bath is not used for a period of, for example, 3 days or longer, it is found that the bath begins to exhibit unacceptable characteristics. So, for example, platings provided at 50°C exhibit unacceptable porosity. Similarly, and as already mentioned, the arsenic begins to come out of solution in the form of a purple suspension, which can result in an inoperable bath. It is possible that the said suspension may indeed also include gold. Furthermore, if baths of this type are allowed to stand a longer time, the gold starts to precipitate out, and eventually the bath destroys itself. Similar results are obtained where the NTA-containing bath of Example VI is observed.

Exactly why the EDMA and CDTA are effective in stabilizing the bath of Example II is not completely understood at the present time, although it is hypothesized that a synergistic action occurs between the EDMA or CDTA, the arsenic, and the hydrazine, which synergistic action stabilize the baths and renders them operable for commercial application over extended periods. It should, in this connection, be further pointed out that a combination of all three compounds, i.e., CDTA (or EDMA), hydrazine and arsenic ion, appear necessary to fully achieve the results of the invention, i.e., an operable commercial barrel gold plating bath, of extended life, which yields superior metal distribution and other desirable qualities during plating of complex parts. It is also reemphasized here that the said EDMA and CDTA-containing baths of Examples III and IV exhibit the important characteristic of displaying efficiencies approximating 100 percent.

The concentration of hydrazine in the bath of the invention should be kept at a concentration of approximately between 0.5 and 15 ml/l, and preferably in the range of 1 to 5 ml/l (calculated at 64 percent hydrazine). Hydrazine per se ($H_2NNH_2$), hydrazine hydrate, as well ad hydrazine sulfate, and other bath soluble salts, can be used for these purposes; however, hydrazine hydrate and hydrazine sulfate are the preferred compounds. Both of these latter compounds are available from Fairmount Chemicals, of Newark, N.J. — e.g., hydrazine hydrate under the designation "64 percent hydrazine."

The trivalent arsenic ion should desirably be present in the above baths in a range of between 0.4 and 12 mg/l, and preferably in the range of 1 to 3 mg/l, since higher concentrations may affect adversely the metal distribution of the resultant platings. The pH of the plating baths is also of great importance to the invention. For optimum results the said pH should be kept in the range of from about 6.5 to 8.0, and preferably still between 7.0 and 7.5. A strike bath, however, can be formulated at a pH of 4.0 to optimize adhesion on Kovar, and pH's as low as 3.9 can be utilized.

Plating temperatures utilized for the baths of the invention are preferably kept close to 50°C, but can be raised as high as 65°C. However, it may be noted here that the bath has a tendency to become unstable as the temperature increases. It should also be re-emphasized, that although the baths of this invention are particularly suitable for barrel plating operations, they also yield excellent results for rack plating applications, wherein similarly superior metal distribution and other desirable plating surface qualities are provided.

As has already been indicated, conductivity and buffering salts, in the form of phosphate compounds such as dipotassium phosphate and mono potassium phosphate, are added to the present baths in quantities appropriate to provide a specific gravity in the range of 8° to 20° Baume, and preferably in the range between 12° to 16° Baume. The pH is adjusted by utilizing phosphoric acid and/or tri potassium phosphate, or other innocuous acids and/or bases as are known for these purposes, may be utilized in a similar manner.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed and limited only by the scope and spirit of the claims now appended hereto.

We claim:

1. An electroplating bath for plating gold, comprising:

an aqueous solution of an alkali-gold cyanide; said gold being present in the range of from about 2 to 36 g/l, calculated as the metal;

from 0.5 to 60 g/l of a chelating agent selected from the group consisting of trans-1, 2-diaminocyclohexane tetra acetic acid, ethylenediamine tetra methylenephosphonic acid, and the bath soluble salts of said acids;

from 0.5 to 15 ml/l of hydrazine or a bath soluble salt thereof, calculated as 64 percent hydrazine;

as an agent for improving the distribution and aesthetic qualities of the deposit, between from about 0.4 to 12 mg/l of trivalent arsenic ion, calculated as the metal; and as additional conductivity and buffering compounds, one or more alkali phosphates, said compounds being present in concentrations appropriate in the presence of the remaining bath components to adjust the bath specific gravity to a desired level of from about 8° to 20° Baume, said level being above that which would be achieved in the absence of said compounds.

2. A bath in accordance with claim 1, wherein the pH of said bath is adjusted by addition of innocuous acids and bases, to the range between from about 3 to 8.

3. A bath in accordance with claim 2, wherein said specific gravity is in the range of from about 12° to 16° Baume.

4. A bath in accordance with claim 3, wherein said pH is maintained in the range between about 6.5 and 8.0.

5. A bath in accordance with claim 4, wherein said chelating agent is present in concentrations of from about 1 to 5 g/l, said hydrazine compound in concentrations of 1 to 5 ml/l, and said arsenic ion in the range of from 1 to 3 mg/l.

6. A bath in accordance with claim 5, wherein said chelating agent is selected from the group consisting of trans-1, 2-diaminocyclohexane tetra acetic acid, and the bath salts thereof.

7. A bath in accordance with claim 5, wherein said chelating agent is selected from the group consisting of ethylenediamine tetra methylenephosphonic acid, and the bath soluble salts thereof.

8. A bath in accordance with claim 4, wherein the pH is maintained in the range between 7.0 and 7.5.

9. A method for electroplating of complex parts with gold, comprising:

barrel plating said complex parts in an aqueous solution of an alkali-gold metal cyanide, said gold being present from about 2 to 36 g/l calculated as the metal;

said bath further including as a chelating agent from 0.5 to 60 g/l of one or more compounds selected from the group consisting of trans-1, 2-diaminocyclohexane tetra acetic acid, ethylenediamine tetra methylenephosphonic acid, and the bath soluble salts of said acids, between 0.5 and 15 ml/l of hydrazine or a bath soluble salt thereof, calculated as 64 percent hydrazine; from 0.4 to 12 mg/l of trivalent arsenic ion; and as additional conductivity and buffering compounds, one or more alkali phosphate compounds in concentrations appropriate in the presence of the remaining bath components to adjust the bath specific gravity to a desired level of between 8° to 20° Baume, said level being above that which would be achieved in the absence of said compounds; and the pH of said bath being maintained between about 3.0 and 8.0 during said barrel plating operation.

10. A method in accordance with claim 12, wherein said pH is maintained about 7.0 and 7.5 during said plating operation.

11. A method in accordance with claim 10, wherein said temperature is maintained at substantially 50°C.

12. A method in accordance with claim 9, wherein said specific gravity is maintained between about 12° to 16° Baume and said pH between about 6.5 to 8.0 during said plating operation.

13. A method in accordance with claim 12, wherein the temperature of said bath is maintained at between 50° and 65° C during said plating.

* * * * *